United States Patent [19]

Ichikawa et al.

(10) Patent No.: US 6,830,611 B2
(45) Date of Patent: Dec. 14, 2004

(54) OIL-BASE INK COMPOSITION, WRITING UTENSILS AND DYES TO BE USED THEREIN

(75) Inventors: Shuuji Ichikawa, Yokohama (JP); Takayuki Ikai, Yokohama (JP)

(73) Assignee: Mitsubishi Pencil Co., Ltd., Tokyo (JP)

( * ) Notice: Subject to any disclaimer, the term of this patent is extended or adjusted under 35 U.S.C. 154(b) by 61 days.

(21) Appl. No.: 10/130,429

(22) PCT Filed: Sep. 18, 2001

(86) PCT No.: PCT/JP01/08111

§ 371 (c)(1),
(2), (4) Date: May 17, 2002

(87) PCT Pub. No.: WO02/24821

PCT Pub. Date: Mar. 28, 2002

(65) Prior Publication Data

US 2003/0075074 A1 Apr. 24, 2003

(30) Foreign Application Priority Data

Sep. 20, 2000 (JP) ........................................ 2000-285389
Jan. 23, 2001 (JP) ........................................ 2001-014862

(51) Int. Cl.$^7$ ............................................. C09D 11/00
(52) U.S. Cl. ................................ 106/31.43; 106/31.28; 106/31.58
(58) Field of Search ........................... 106/31.43, 31.58, 106/31.28; 401/209; 118/264; 552/113, 114

(56) References Cited

U.S. PATENT DOCUMENTS

| | | | | |
|---|---|---|---|---|
| 4,168,254 A | | 9/1979 | Fell | |
| 4,272,292 A | * | 6/1981 | Mizuno et al. | 106/31.37 |
| 4,756,758 A | * | 7/1988 | Lent et al. | 106/31.32 |
| 5,013,857 A | | 5/1991 | Berneth et al. | |
| 5,279,655 A | * | 1/1994 | Takazawa et al. | 106/31.43 |
| 5,302,436 A | * | 4/1994 | Miller | 428/32.13 |
| 6,458,193 B1 | * | 10/2002 | VanDahm | 106/31.32 |

FOREIGN PATENT DOCUMENTS

| | | |
|---|---|---|
| EP | 0 550 891 | 7/1993 |
| JP | 63-120768 | 5/1988 |
| JP | 8-183922 | 7/1996 |
| JP | 9-71745 | 3/1997 |
| JP | 10-158558 | 6/1998 |
| JP | 11-12518 | 1/1999 |
| JP | 11-158421 | 6/1999 |
| JP | 11-199804 | 7/1999 |
| JP | 2001-240764 | 9/2001 |
| WO | WO 92/04416 A1 | 3/1992 |

* cited by examiner

Primary Examiner—Helene Klemanski
(74) Attorney, Agent, or Firm—Foley & Lardner LLP

(57) ABSTRACT

An ink composition comprising at least one triarylmethane-based dye as a coloring material, an alcohol having 2 or more carbon atoms, a polyhydric alcohol or a glycol ether as a solvent, and a resin which can dissolve in the solvent, the triarylmethane-based dye comprising a compound represented by the following formula: $[C(-Ar-Y)_3]A$ wherein each Ar is independently an aryl group substituted, or not substituted, by a halogen or an alkyl group, each Y is independently a diethylamino group or hydrogen, provided that at least two Y are a diethylamino group, A is a halogen or an organic acid group, and A is charge-balanced to the residue.

56 Claims, No Drawings

OIL-BASE INK COMPOSITION, WRITING UTENSILS AND DYES TO BE USED THEREIN

TECHNICAL FIELD OF THE INVENTION

The present invention relates to an ink composition suitable for use as an oil-based ink composition for writing instruments and having excellent properties in the solubility of the dye in an ink and in the compatibility with other raw materials, and also relates to writing instruments using the ink composition and a novel dye for the ink composition.

BACKGROUND ART

The oil-based black ink heretofore used is predominantly an inexpensive nigrosine in view of the cost or a metal complex salt dye in view of the fastness. However, the nigrosine has a problem in the solubility or compatibility with other raw materials and the metal complex salt dye is disadvantageously low in the concealing property. Accordingly, in the case of using the metal complex salt dye, this dye is, in many cases, used in combination with a triphenylmethane-base (triarylmethane-based) dye giving good coloration but, depending on the solvent or other raw materials used and the amounts added thereof, this causes troubles in the ink, such as extreme increase of the ink viscosity or the generation of precipitates. Also in the case where a pigment dispersion for imparting fastness is used in place of the metal complex salt dye, the same problems are generated on many occasions.

An object of the present invention is to provide an oil-based ink composition exhibiting good compatibility with a metal complex salt dye or other raw materials in an ink, ensuring excellent stability in aging at low temperatures, and containing a dye which can be added, during use of an alcohol having 2 or more carbon atoms, a polyhydric alcohol or a glycol ether, in a high concentration as a-dye for imparting a concealing property by forming a black or blue color and can be free of the above-described problems even under a high-concentration condition. The object of the present invention includes providing a dye useful therefor.

As for the triarylmethane-based dye used as a main dye of an ink for writing instruments, salt-forming dyes, using as a matrix a basic dye where the amino group introduced into the aromatic ring is a monomethylamino group and/or a dimethylamino group and/or a monophenylamino group, are known. Examples of such dyes are C.I. Basic Violet 1, C.I. Basic Violet 3 and C.I. Basic Blue 26.

However, in the case where this widely employed triphenylmethane-base dye and a metal complex salt dye are used in combination and dissolved in an alcohol having about 4 or fewer carbon atoms, a glycol or a glycol ether used as a solvent of an ink for writing instruments, the composition suffers from very poor stability and when left standing at low temperatures, precipitates are sometimes generated.

In the case of forming an ink for writing instruments by using these dyes, the dye concentration must be high to a certain degree to allow a drawn line to have a concealing power (necessary density of a drawn line), however, if the dye concentration is high, a precipitate is generated and the ink is not suitable as an ink for writing instruments.

These problems are more outstanding when a solvent having a high vapor pressure is used to obtain quick drying of the dawn line such as, for example, propylene glycol monomethyl ether.

The present invention has been made by taking account of these problems in conventional techniques. Another object of the present invention is to provide a triarylmethane-based, particularly a triphenylmethane-based, dye suitable for an ink for writing instruments which exhibits excellent flowability and good stability even when used in combination with a metal complex salt and dissolved in an alcohol having about 4 or fewer carbon atoms, a glycol or a glycol ether, particularly a propylene glycol monomethyl ether, commonly used as a solvent of an ink for writing instruments.

DISCLOSURE OF THE INVENTION

In order to attain the above-described objects, the present invention provides the following.

(1) An ink composition comprising at least one triarylmethane-based dye as a coloring material, an alcohol having 2 or more carbon atoms, a polyhydric alcohol or a glycol ether as a solvent, and a resin which can dissolve in the solvent, said triarylmethane-based dye being represented by the following formula:

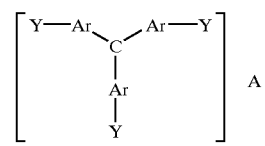

wherein Ar is an aryl group substituted, or not substituted, by a halogen or an alkyl group, Y is a diethylamino group or hydrogen, provided that at least two Y are a diethylamino group, A is a halogen or an organic acid group, and A is charge-balanced to the residue.

(2) The ink composition as above, wherein three aryl groups in the dye all are a phenyl group.

(3) The ink composition as above, wherein three Y in the dye all are a diethylamino group.

(4) The ink composition as above, wherein all aryl groups in the dye are not substituted by a halogen or an alkyl group.

(5) The ink composition as above, wherein the dye is a compound where A is an organic acid group, and dissolves in an alcohol having 2 or more carbon atoms, a polyhydric alcohol or a glycol ether used as a solvent, to a concentration of 20 mass % or more.

(6) The ink composition as above, wherein A in the dye is an organic acid group selected from the group consisting of a carboxyl group, an acyl group, a thiocarboxyl group, a dithiocarboxyl group, a sulfonic acid group, a sulfinic acid group, a sulfenic acid group, a sulfoamino group, a mercapto group, a phenolic hydroxyl group, a hydroxyamino group and a hydroxyimino group.

(7) The ink composition as above, wherein A in the dye is an acid group of an organic acid selected from the group consisting of adipic acid, acetoacetic acid, anisic acid, abietic acid, benzoic acid, succinic acid, citric acid, phthalic acid, oleic acid, stearic acid, linoleic acid, linolenic acid, toluic acid, naphthoic acid, palmitic acid, hydroxybenzoic acid, cinnamic acid, hydroxycinnamic acid, pimaric acid, piperonylic acid, phenylpropionic acid, phenoxyacetic acid, mandelic acid, maleic acid, rosin-modified maleic acid, hexanethiocarboxylic acid, hexanedithiocarboxylic acid, laurylsulfonic acid, 1-piperidinesulfinic acid, benzenesulfenic acid, ethanesulfinyl chloride, phenylmethanethiol, benzenedithiol, phenylhydroxylamine, hydroxyaminophenol, cyclohexanoneoxime, benzaldehydeoxime, laurylphosphoric acid ester, dinonylphenylphosphoric acid ester, anthranilic acid and hippuric acid.

(8) The ink composition as above, wherein A in the dye contains an aromatic ring having at least one sulfonic acid group.

(9) The ink composition as above, wherein A in the dye is selected from the group consisting of anionic surfactants such as alkylbenzenesulfonic acid and salts thereof, alkylnaphthalenesulfonic acid and salts thereof, alkylarylsulfonate formalin condensate and salts thereof, and alkyldiphenyletherdisulfonic acid and salts thereof, and acidic dyes such as C.I. Acid orange 7, C.I. Acid Yellow 36 and C.I. Acid Red 88.

(10) The ink composition as above, which further contains a metal complex salt dye or a pigment.

(11) The ink composition as above, which contains at least polyvinylbutyral as said resin.

(12) The ink composition as above, wherein the solvent comprising an alcohol having 2 or more carbon atoms, a polyhydric alcohol or a glycol ether and being an aliphatic solvent occupies 40 mass % or more of the entire solvent of the ink composition.

(13) The ink composition as above, wherein the solvent contains at least one of the following solvents i) to iii) as the main solvent:

i) a solvent represented by the chemical formula: $C_nH_{2n+1}OC_3H_6OH$ wherein n is an integer of 1 to 3;
ii) a propylene glycol monomethyl ether; and
iii) a solvent represented by the following structural formula (2):

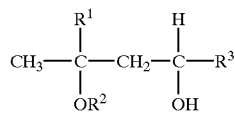

(2)

wherein $R^1$, $R^2$ and $R^3$ each is independently H or $CH_3$.

(14) A writing instrument comprising the above-described ink composition.

(15) The writing instrument as above, which is a sign pen.
(16) The writing instrument as above, which is a ballpoint pen.
(17) The writing instrument as above, which is an ink stamp pad.
(18) A dye represented by the following formula (3):

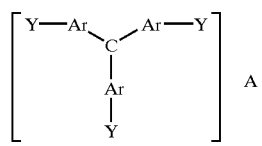

(3)

wherein each Ar is independently an aryl group substituted, or not substituted, by a halogen or an alkyl group, each Y is independently a diethylamino group or hydrogen, provided that at least two Y are a diethylamino group, A is an organic acid group, and A is charge-balanced to the residue.

(19) The dye as above, wherein all Ar are phenyl.
(20) The dye as above, which dissolves in a propylene glycol monomethyl ether to a concentration of 10 wt % or more.

(21) The dye as above, wherein three Y all are a diethylamino group.
(22) The dye as above, wherein the organic acid group contains an aromatic ring having at least one sulfonic acid group.

MODE FOR CARRYING OUT THE INVENTION

The coloring material used in the ink composition of the present invention is a triarylmethane-based dye represented by formula (1):

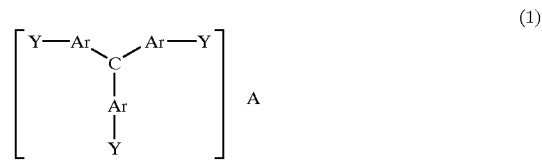

(1)

wherein each Ar is independently an aryl group substituted, or not substituted, by a halogen or an alkyl group, each Y is independently a diethylamino group or hydrogen, provided that at least two Y are a diethylamino group, A is a halogen or an organic acid group, and A is charge-balanced to the residue.

This triarylmethane-based dye is a triarylmethane-based basic dye represented by the following formula (4):

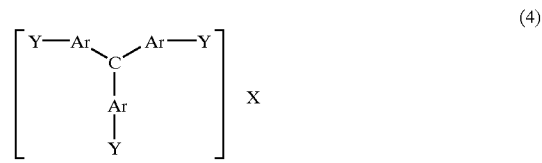

(4)

wherein each Ar is independently an aryl group substituted, or not substituted, by a halogen or an alkyl group, each Y is independently a diethylamino group or hydrogen, provided that at least two Y are a diethylamino group, X is a halogen, and A is charge-balanced to the residue, or a dye resulting from the salt formation of the triarylmethane-based basic dye with an organic acid or an organic acid salt. This triarylmethane-based dye is characterized in that two or three amino groups bonded to the aromatic ring are only diethylamino groups.

In using a metal complex salt dye or a pigment dispersion in combination with a triphenylmethane-base dye giving good coloration, troubles occur in an ink due to the solvent or raw materials used or the amounts added thereof such as, for example, an extreme increase in the ink viscosity or generation of a precipitate. However, when an oil-based ink composition is constructed by using an above-described dye as the triphenylmethane-base dye according to the present invention, these problems can be solved. The above-described dye can be added, on use of an alcohol having 2 or more carbon atoms, a polyhydric alcohol or a glycol ether, in a high concentration as a dye imparting a concealing property by a black or blue color and even under a high-concentration condition, can exhibit good compatibility with a metal complex salt dye or other raw materials in the ink, particularly polyvinylbutyral resin. Therefore, an oil-based ink composition having excellent stability, in aging at low temperatures, can be provided.

The reasons why the above-described dye can exert these effects are considered to be as follows. The amino groups introduced into the aromatic ring are all diethylamino groups and therefore, the affinity for the alkyl group moiety of a solvent is very high and, as a result, the solvent is easily solvated and high dissolution stability is attained. Although a metal complex salt dye or a pigment dispersion is readily affected by an acid base, these are considered not to affect the balance in the exchange equilibrium of counter ion in the alcohol-soluble type dye of formula (1). Furthermore, the medium dissolving a metal complex salt dye or a pigment dispersion is dissolved in an alcohol, a polyhydric alcohol or a glycol ether without altering the balance of the dissolution equilibrium with other raw materials, so that troubles such as an increase in viscosity or the generation of precipitates can be prevented from occurring even when a resin having high absorptivity such as polyvinylbutyral resin is used. This seems to be the reason why an oil-based ink composition having excellent stability in aging under high-concentration conditions or at low temperatures can be provided.

The triarylmethane-based basic dye represented by formula (4) which can be particularly preferably used in the present invention includes C.I. Basic Violet 4 as a resonance hybrid represented by the following structural formula (5):

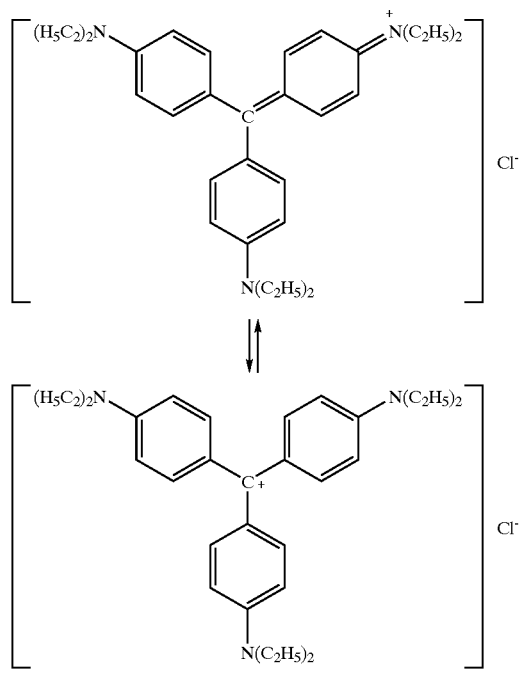

(5)

Two diethylamino groups may be bonded to the aromatic rings of the triarylmethane-based dye but three diethylamino groups are preferably bonded because these groups advantageously act in view of steric hindrance and the stability of the molecule is improved. The aryl group may be a naphthalene group or the like but is preferably a phenyl group. The aryl group may also be a substituted phenyl group where a halogen or an alkyl group (the number of carbon atoms is generally from 1 to 3, preferably 1 or 2) is introduced. As for the triarylmethane-based dye where diethylamino groups are bonded, basic dyes having a halogen (preferably chlorine) as a counter ion are known or commercially available, such as C.I. Basic Violet 4.

In the present invention, such a triarylmethane-based basic dye may be used as it is but a dye after the salt formation, by reacting the dye with an organic acid or an organic acid salt, is preferably used in the ink composition. This is considered preferable because when an alcohol, a polyhydric alcohol or a glycol ether is used as a solvent, the triarylmethane-based skeleton forms a strong ion pair with the organic acid group and the undesired ionic interaction with other components such as metal complex salt dye is rendered difficult to occur.

Examples of the organic group of the salt-forming dye include acidic functional groups such as carboxyl group, acyl group, thiocarboxyl group, dithiocarboxyl group, sulfonic acid group, sulfinic acid group, sulfenic acid group, sulfoamino group, mercapto group, phenolic hydroxyl group, hydroxyamino group and hydroxyimino group.

For forming a salt with this organic acid group, an organic acid or an organic acid salt is used and these are not particularly limited and any organic acid or organic acid salt can be used insofar as it forms a salt formation product with a basic dye.

Specific examples of the organic acid or the organic acid salt which can be used in the salt formation with an organic acid group include adipic acid, acetoacetic acid, anisic acid, abietic acid, benzoic acid, succinic acid, citric acid, phthalic acid, oleic acid, stearic acid, linoleic acid, linolenic acid, toluic acid, naphthoic acid, palmitic acid, hydroxybenzoic acid, cinnamic acid, hydroxycinnamic acid, pimaric acid, piperonylic acid, phenylpropionic acid, phenoxyacetic acid, mandelic acid, maleic acid, rosin-modified maleic acid, hexanethiocarboxylic acid, hexanedithiocarboxylic acid, laurylsulfonic acid, 1-piperidinesulfinic acid, benzenesulfenic acid, ethanesulfinyl chloride, phenylmethanethiol, benzenedithiol, phenylhydroxylamine, hydroxyaminophenol, cyclohexanoneoxime, benzaldehydeoxime, laurylphosphoric acid ester, dinonylphenylphosphoric acid ester, anthranilic acid, hippuric acid, and salts thereof.

Among the salt formation products having such an organic acid group, those having an organic acid group containing an aromatic ring having at least one sulfonic acid are preferred because the solubility of the dye as a simple substance is improved as compared with the case using other organic acid groups and even when used in a high concentration in combination with a metal complex salt dye, good stability is exhibited.

Examples of the organic acid or organic acid salt containing an aromatic ring having at least one sulfonic acid group include anionic surfactants such as alkylbenzenesulfonic acid and salts thereof, alkylnaphthalenesulfonic acid and salts thereof, alkylarylsulfonate formalin condensate and salts thereof, and alkyldiphenyletherdisulfonic acid and salts thereof, and acidic dyes such as C.I. Acid Orange 7, C.I. Acid Yellow 36 and C.I. Acid Red 88. Among these, preferred are salts of alkyldiphenyletherdisulfonic acid, C.I. Acid Orange 7 and C.I. Acid Yellow 36, more preferred are salts of alkyldiphenyletherdisulfonic acid with the alkyl group having from 8 to 13 carbon atoms.

For forming a dye having the organic acid group, the basic dye having a triaryl-base skeleton and the organic acid or organic acid salt may be subjected to an acid base reaction in a normal manner to form a salt formation product and the method therefor is not particularly limited, however, the following method is generally used.

The basic dye is dissolved in warmed water and thereto, the organic acid or organic acid salt is added while stirring to form a salt. Or, inversely, the organic acid or organic acid salt is dissolved in warmed water and thereto, the basic dye is added to form a salt. The particular conditions such as reaction temperature, pH at the reaction and pH at the completion of reaction are appropriately selected according to the dye formed as a salt.

For recovering and purifying the salt formation product from water, various methods such as filtration, salting out, solvent extract and addition of poor solvent may be used in combination.

The dye represented by formula (1), particularly the organic acid group-containing salt dye, has excellent solubility in an alcohol having 2 or more carbon atoms, a polyhydric alcohol or a glycol ether. In particular, when this dye is dissolved in an alcohol having 2 or more carbon atoms, a glycol or a glycol ether, the dye exhibits good stability even when used in combination with a metal complex salt dye or a pigment. The solubility and stability are excellent even when the number of carbon atoms is 6 or less, or 4 or less. The reasons therefor are not clearly known but are considered to be as follows.

All of the amino groups introduced into the aromatic ring are diethylamino groups and therefore, the affinity for the alkyl group moiety of the solvent is greatly intensified and, as a result, the solvent is easily solvated. Also, good solubility is attained particularly when an organic acid or organic acid salt containing an aromatic ring having at least one sulfonic acid group is used, and this is considered ascribable to the fact that such a compound readily forms a very strong ion pair with the basic dye and can be present in a stable state in the solvent. In other words, the dye of the present invention is considered to exhibit good stability even when used in combination with a metal complex salt dye, because the dissolution stability of the dye itself is improved and moreover, due to the formation of a strong ion pair with the organic acid, ionic behavior with a metal complex salt dye hardly occurs.

This dye of the present invention is also advantageous in that it exhibits excellent solubility even when the alcohol, polyhydric alcohol or glycol ether is a low-viscosity or high-volatility solvent component, namely, the number of carbon atoms is small. For example, a dye capable of dissolving in propylene glycol monomethyl ether to a concentration of 10 mass % or more (at 25° C.) is provided.

The amount of this dye blended may be from 0.5 to 30 mass % based on the ink composition but this varies depending on the product used. For example, in the case of an oil-based sign pen, the amount blended is from 0.5 to 15 mass % but in the case of an oil-based ballpoint pen or an oil-based ink stamp pad, the amount blended is from 0.5 to 30 mass %. As this amount added gives a higher blending concentration, the concealing property is more elevated.

As for the coloring agent other than the dye represented by formula (1) for use in the oil-based ink composition of the present invention, dyes and pigments other than the dye represented by formula (1) can be used.

The dye which can be used may be selected from dyes commonly used for dye ink composition, such as direct dye, acid dye, basic dye, mordant/acidic mordant dye, alcohol-soluble dye, azoic dye, sulfide/sulfide vat dye, vat dye, disperse dye, oil-soluble dye, food dye and metal complex salt dye, and inorganic or organic pigments used for pigment ink composition. The amount of the dye blended is from 1 to 50 mass % based on the entire amount of the composition.

The pigment is preferably a pigment hardly soluble in the organic solvent used and giving an average particle size of 30 to 700 nm after the dispersion. The amount of the pigment blended can be selected, according to the necessity, in the range from 0.5 to 25 mass %, preferably from 0.5 to 20 mass %, based on the entire amount of the ink composition.

The pigments which can be used may be used individually or in a combination of two or more thereof. If desired, an inorganic pigment dispersion, a dye or the like may also be added to an extent of not adversely affecting the dispersion stability. Other examples include resin emulsions obtained by the polymerization of styrene, acrylic acid, acrylic acid ester, methacrylic acid, methacrylic acid ester, acrylonitrile or olefin-base monomer, hollow resin emulsions which swell in ink and become amorphous, and organic multicolor pigments comprising a dyed resin particle obtained by dyeing the above-described emulsion itself with a coloring agent.

In the case where a pigment is used for the coloring material of the ink composition of the present invention, the dispersant used is a resin capable of dispersing the pigment and may be selected from ketone resin, styrene resin, styrene-acrylic resin, terpene phenol resin, rosin-modified maleic acid resin, rosin phenol resin, alkylphenol resin, phenol-base resin, styrene maleic acid resin, rosin-base resin, acryl-base resin, urea aldehyde-base resin, maleic acid-base resin, cyclohexanone-base resin and resin represented by polyvinylbutyral and polyvinylpyrrolidone. The dispersant is not limited in kind and an activator or an oligomer may be used insofar as it satisfies the purpose. Specific examples of the dispersant include synthetic resins such as polyvinyl alcohol, polyvinylpyrrolidone, polyvinylbutyral, polyvinyl ether, styrene-maleic acid copolymers, ketone resin, hydroxyethyl cellulose and derivatives thereof, and styrene-acrylic acid copolymers, and also include propylene oxide-ethylene oxide adducts and amine-base oligomers of polyester.

In the case where the coloring material used in the present invention is a pigment, the pigment dispersion ink composition may be produced by conventionally known various methods. For example, respective components described above are mixed and stirred by a stirrer such as dissolver, or mixed and pulverized by a ball mill, a roll mill, a bead mill, a sand mill, a pin mill or the like, and then coarse pigment particles, undissolved matters or intermingled solid matters are removed by centrifugal separation or filtration, whereby the ink composition can be easily obtained.

The solvent for use in the ink composition of the present invention is preferably a solvent selected from the group consisting of an alcohol, a polyhydric alcohol and a glycol ether. In the present invention, the ink composition containing a solvent selected from the group consisting of an alcohol, a polyhydric alcohol and a glycol ether is referred to as an oil-based ink composition.

The alcohol is an aliphatic alcohol having 2 or more carbon atoms and specific examples thereof include ethanol, n-propanol, isopropanol, n-butanol, isobutanol, tert-butyl alcohol, 1-pentanol, isoamylalcohol, sec-amylalcohol, 3-pentanol, tert-amylalcohol, n-hexanol, methylamylalcohol, 2-ethylbutanol, n-heptanol, 2-heptanol, 3-heptanol, n-octanol, 2-octanol, 2-ethylhexanol, 3,5,5-trimethylhexanol, nonanol, n-decanol, undecanol, n-decanol, trimethylnonylalcohol, tetradecanol, heptadecanol, cyclohexanol, 2-methylcyclohexanol, benzyl alcohol and other various higher alcohols.

Examples of the polyhydric alcohol include polyhydric alcohols having two or more carbon atoms and two or more hydroxyl groups within the molecule, such as ethylene glycol, diethylene glycol, 3-methyl-1,3-butanediol, triethylene glycol, dipropylene glycol, 1,3-propanediol, 1,3-butanediol, 1,5-pentanediol, hexylene glycol and octylene glycol.

Examples of the glycol ether include methyl isopropyl ether, ethyl ether, ethyl propyl ether, ethyl butyl ether, isopropyl ether, butyl ether, hexyl ether, 2-ethylhexyl ether, ethylene glycol monohexyl ether, ethylene glycol monophenyl ether, ethylene glycol mono-2-ethylbutyl ether, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, triethylene glycol monobutyl ether, tetraethylene glycol monobutyl ether, 3-methyl-3-methoxy-1-butanol, 3-methoxy-1-butanol, propylene glycol monomethyl ether, propylene glycol monoethyl ether, propylene glycol monopropyl ether, propylene glycol monobutyl ether, propylene glycol phenyl ether, propylene glycol tertiary butyl ether, dipropylene glycol monomethyl ether, dipropylene glycol monoethyl ether, dipropylene glycol monopropyl ether, dipropylene glycol monobutyl ether, tripropylene glycol monomethyl ether, tripropylene glycol monobutyl ether and tetrapropylene glycol monobutyl ether.

Among these solvents, glycol ether having from 2 to 7 carbon atoms is preferred because the effect is clearly provided. In view of safety, peroral toxicity and the like, an organic solvent other than ethylene glycol derivatives is preferably used.

The present inventors propose an oil-based ink composition for ballpoint pens, using one or a combination of the following solvents so as to provide an ink having excellent properties in smooth writing, quick drying and the like, and the dye of the present invention is also particularly useful for these solvent systems:

(i) a solvent having the chemical formula: $C_nH_{2n+1}OC_3H_6OH$ (wherein n is an integer of 1 to 3);
ii) a propylene glycol monomethyl ether; and
iii) a solvent having the following chemical formula (2):

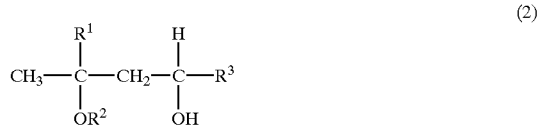

(2)

wherein $R^1$, $R^2$ and $R^3$ each is independently H or $CH_3$.

In addition to these solvents, a solvent shown below may also be added within the range of not adversely affecting the solubility or exertion of the performance of a phosphoric acid ester and an imidazoline-type activator or a polyoxyethylene alkylamine.

Examples thereof include polyhydric alcohol derivatives, sorbitan fatty acid derivatives, polyglycerin higher fatty acid derivatives, saccharose fatty acid derivatives and propylene glycol fatty acid derivatives.

Examples of esters as the solvent include various esters such as propylene glycol methyl ether acetate, propylene glycol diacetate, 3-methyl-3-methoxybutyl acetate, propylene glycol ethyl ether acetate, ethylene glycol ethyl ether acetate, butyl formate, isobutyl formate, isoamyl formate, propyl acetate, butyl acetate, isopropyl acetate, isobutyl acetate, isoamyl acetate, methyl propionate, ethyl propionate, propyl propionate, isobutyl propionate, isoamyl propionate, methyl butyrate, ethyl butyrate, propyl butyrate, methyl isobutyrate, ethyl isobutyrate, propyl isobutyrate, methyl valerate, ethyl valerate, propyl valerate, methyl isovalerate, ethyl isovalerate, propyl isovalerate, methyl trimethylacetate, ethyl trimethylacetate, propyl trimethylacetate, methyl caproate, ethyl caproate, propyl caproate, methyl caprylate, ethyl caprylate, propyl caprylate, methyl laurate, ethyl laurate, methyl oleate, ethyl oleate, triglyceride caprylate, tributyl acetate citrate, octyl oxystearate, propylene glycol monolysinolate, methyl 2-hydroxyisobutyrate and 3-methoxybutyl acetate.

Specific examples of the solvent diether or diester having no hydroxyl group within the molecule include ethylene glycol diethyl ether, ethylene glycol dibutyl ether, diethylene glycol diethyl ether, diethylene glycol dibutyl ether, diethylene glycol dimethyl ether and dipropylene glycol dimethyl ether.

If a solvent component having an aromatic ring is present in a large amount in the solvent, the dye exhibits solubility different from that in a normal aliphatic solvent, therefore, in using the C.I. Basic Violet 4-type dye of the present invention, the amount of the aromatic solvent is limited. To this effect, 40 mass % or more of the entire solvent of the ink composition is preferably occupied by an aliphatic solvent component. In particular, 40 mass % or more is preferably occupied by an aliphatic solvent component such as an alcohol having 2 or more carbon atoms, a polyhydric alcohol or a glycol ether.

Examples of the resin for use in the oil-based ink composition of the present invention include ketone resin, styrene resin, styrene-acrylic resin, terpene phenol resin, rosin-modified maleic acid resin, rosin phenol resin, alkyl phenol resin, phenolic resin, styrene maleic acid resin, rosin-base resin, acryl-base resin, urea aldehyde-base resin, maleic acid-base resin, cyclohexanone-base resin and resins represented by polyvinylbutyral and polyvinylpyrrolidone, which can be used also as the dispersant for a pigment.

Among these, polyvinylbutyral resin has strong film forming property of a drawn line in writing or strong activity of increasing the viscosity of ink and therefore, is used as an added resin in many cases. However, since the dissolved state of polyvinylbutyral resin in the solvent is greatly affected by the acid base component in the solvent, the kinds of raw materials used must be selected with care. Particularly, in the case of using a salt-forming dye, the region where the ink is stable greatly differs, therefore, a more stable dye is preferably used when polyvinylbutyral is used. That is, a dye having higher stability than that of an ink comprising C.I. Basic Violet 1 or C.I. Basic Violet 3 used as a dye for imparting a concealing property, is preferably selected from coloring materials. The amount blended of the resin including polyvinylbutyral is preferably from 1 to 30 mass %, more preferably from 1 to 20 mass %. If the amount blended is less than 1 mass %, the adjustment of viscosity or abrasion at the pen tip becomes difficult, whereas if it exceeds 30 mass %, the raw materials other than resin cannot be blended or the writing feeling is adversely affected.

In the present invention, if desired, a rust preventive, an antifungal, a surfactant, a lubricant, a wetting agent and the like, which cause no adverse effect on the ink and are compatible with the ink, can be blended. In particular, a fatty acid can be suitably used as the lubricant. Also, a nonvolatile solvent or the like compatible with the main solvent can be blended as a dry inhibiting additive, within the range of not adversely affecting the properties of the product.

The ink composition of the present invention can be usefully used for writing instruments such as oil-based sign pen and oil-based ballpoint pen, or desk articles such as oil-based ink stamp pad.

Out of the dyes represented by formula (1) for use in the ink composition of the present invention, the organic acid group-containing salt dye is a novel dye and as another aspect, the present invention provides a dye represented by the following formula (3):

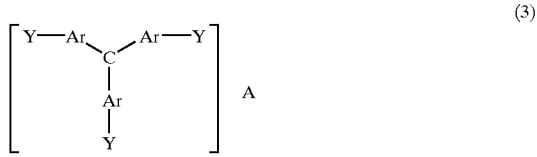

(3)

wherein each Ar is independently an aryl group substituted or not substituted by a halogen or an alkyl group, each Y is independently a diethylamino group or a hydrogen, provided that at least two Y are a diethylamino group, A is an organic acid group, and A is charge-balanced to the residue.

This novel dye of the present invention is useful, as described above, as a dye constituting the oil-based ink composition and moreover, is advantageous in that the solubility particularly in an alcohol having about 4 or fewer carbon atoms, a glycol or a glycol ether is excellent and the dye dissolves in a propylene glycol monomethyl ether to a concentration of 10 mass % or less (at 25° C.). By virtue of such solubility, when the dye is applied to an oil-based ballpoint pen having an ink flow rate of 100 mg/100 m or less, the drawn line can exert excellent concealing property.

The preferred compounds as the dye of formula (3) are the same as preferred compounds described above for the dye of formula (1) and these compounds are also preferred in the above-described use.

The reason why, when this dye is dissolved in an alcohol having about 4 or less carbon atoms, a glycol or a glycol ether, good stability is attained even if used in combination with a metal complex salt dye is not clearly known but is considered to be as follows.

That is, all of the amino groups introduced into the aromatic ring are diethylamino groups and therefore, the affinity for the alkyl group moiety of the solvent is greatly intensified, as a result, the solvent is readily solvated. On the other hand, if the amino group introduced into the aromatic ring is a dimethylamino group and/or a monomethylamino group, the affinity for the alkyl group moiety of the solvent is weak and the solvent is hardly solvated. Furthermore, if a hydrogen atom is bonded directly to the nitrogen atom as in the monomethylamino group, hydrogen bonding readily occurs among molecules, that is, the cohesive strength of the molecule itself is intensified, and the stability decreases. Also, the reason why good solubility is attained particularly when an organic acid or organic acid salt containing an aromatic ring having at least one sulfonic acid group is used, is considered to be because such a compound readily forms a very strong ion pair with the basic dye and can be present in a stable state in the solvent.

In other words, the dye of formula (3) is considered to exhibit good stability even when used in combination with a metal complex salt dye, because the dissolution stability of the dye itself is improved and, moreover, due to the formation of a strong ion pair with the organic acid, ionic behavior with a metal complex salt dye is hardly occurs. Furthermore, when the amino group introduced into the aromatic ring is a diethylamino group, this advantageously acts in view of steric hindrance as compared with the case where a dimethylamino group is introduced and, as a result, the stability of the molecule itself is improved.

The dye of formula (3) has been developed particularly for use in an oil-based ink composition but, needless to say, this dye is useful for uses other than writing instruments.

According to the present invention, writing instruments using the above-described ink composition or dye, for example, ballpoint pen, sign pen and ink stamp pad, are also provided.

EXAMPLES

The present invention is described in greater detail below by referring to Examples, however, the present invention should not be construed as being limited to these Examples. In the following, the amount blended is based on the mass. The components used in Examples and Comparative Examples are shown below.

C.I. Acid Yellow 36:

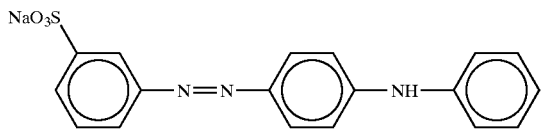

C.I. Acid Yellow 42:

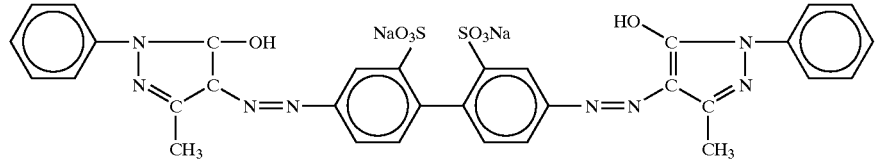

C.I. Acid Orange 7:

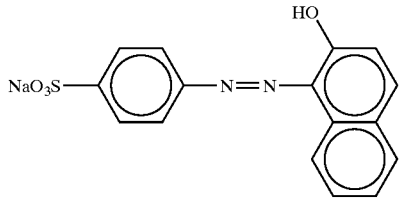

Sodium alkyldiphenyletherdisulfonate:

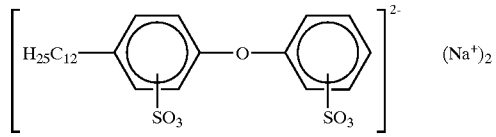

C.I. Basic Violet 1:

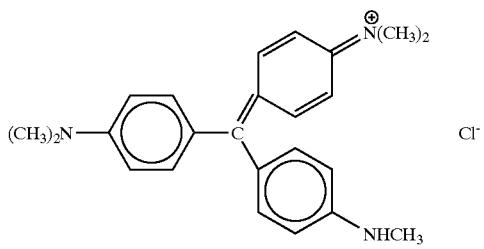

C.I. Basic Violet 3:

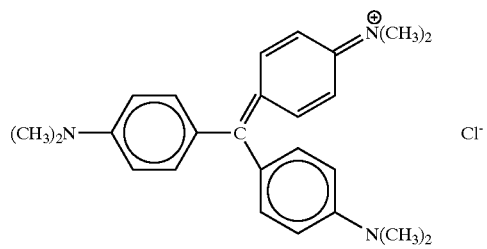

C.I. Basic Green 1:

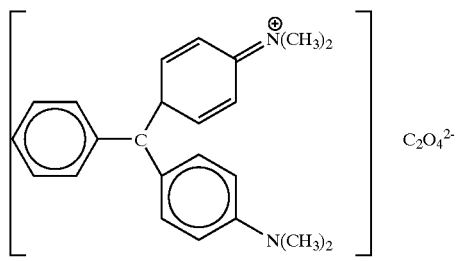

Spilon Black GMH Special
  Salt formation product of acidic chromium-containing dye+amine component
Spilon Yellow Series
  Salt formation product of basic dye+acidic component
Valifast Black
  Salt formation product of acidic chromium-containing dye+amine component
Printex #35
  Carbon black (pigment)
YPGOL
  Terpene phenol resin
RAROPEARL A101
  Urea form aldehyde condensate
SAVINIL Blue GLS
  Salt formation product of cyanine blue dye+amine component

Production Example of Organic Acid Group-Containing Dye

The salt formation products of Examples 2, 5, 8 and 21 were produced as follows.

In 80 g of purified water heated to 90° C., 20 g of C.I. Acid Orange 7 was dissolved. Thereto, C.I. Basic Violet 4 was added while stirring until the reaction solution reached a pH of 6.0. Thereafter, the reaction solution was stirred for 30 minutes. The amount of C.I. Basic Violet 4 added was 25 g.

After the completion of stirring, the reaction solution was allowed to cool to room temperature, the viscous matter precipitated was separated and collected and the water content in the viscous matter was removed to obtain 35 g of a product.

The product did not dissolve in water but dissolved in an oil phase such as alcohol and from these and others, this product was confirmed as a salt comprising a cation moiety of C.I. Basic Violet 4 and an anion moiety (organic acid group) of C.I. Acid Orange 7.

Other salt formation products of Examples and Comparative Examples below were produced in the same manner.

Using the thus-produced salt formation product dyes, ink compositions of Examples and Comparative Examples were prepared and evaluated.

| Oil-based Sign Pen Form | |
|---|---|
| (Example 1) | |
| Spilon Black GMH Special [produced by Hodogaya Chemical Co., Ltd.] | 5.0% |
| Salt formation product of C.I. Basic Violet 4 and C.I. Acid Yellow 36 | 4.0% |
| Polyvinylbutyral BL-1 [produced by Sekisui Chemical Co., Ltd.] | 1.5% |
| YP90L [produced by Yasuhara Chemical] | 3.0% |
| Ethanol | 30.0% |
| Propylene glycol monomethyl ether | 33.5% |
| 3-Methoxy-1-butanol | 20.0% |
| (Comparative Example 1) | |
| Spilon Black GMH Special [produced by Hodogaya Chemical Co., Ltd.] | 5.0% |
| Salt formation product of C.I. Basic Violet 1 and C.I. Acid Yellow 36 | 4.0% |
| Polyvinylbutyral BL-1 [produced by Sekisui Chemical Co., Ltd.] | 1.5% |
| YP90L [produced by Yasuhara Chemical] | 3.0% |
| Ethanol | 30.0% |
| Propylene glycol monomethyl ether | 33.5% |
| 3-Methoxy-1-butanol | 20.0% |
| (Example 2) | |
| Carbon Black #25 [produced by Degusa Co.] | 3.0% |
| Salt formation product of C.I. Basic Violet 4 and C.I. Acid Orange 7 | 4.0% |
| Spilon Yellow C-GNH [produced by Hodogaya Chemical Co., Ltd.] | 1.5% |
| Polyvinylbutyral BL-1 [produced by Sekisui Chemical Co., Ltd.] | 1.0% |
| Ethanol | 38.5% |
| Propylene glycol monomethyl ether | 40.0% |
| Benzyl alcohol | 12.0% |
| (Comparative Example 2) | |
| Carbon Black #25 [produced by Degusa Co.] | 3.0% |
| Salt formation product of C.I. Basic Violet 1 and C.I. Acid Orange 7 | 4.0% |

-continued

| | |
|---|---|
| Spilon Yellow C-GNH [produced by Hodogaya Chemical Co., Ltd.] | 1.5% |
| Polyvinylbutyral BL-1 [produced by Sekisui Chemical Co., Ltd.] | 1.0% |
| Ethanol | 38.5% |
| Propylene glycol monomethyl ether | 40.0% |
| Benzyl alcohol | 12.0% |

(Example 3)

| | |
|---|---|
| Valifast Black #3830 [produced by Orient Chemical Ind. Ltd.] | 5.0% |
| Salt formation product of C.I. Basic Violet 4 and sodium alkyldiphenyletherdisulfonate | 3.0% |
| Polyvinylbutyral BL-S [produced by Sekisui Chemical Co., Ltd.] | 1.5% |
| Markide No. 34 [produced by Arakawa Chemical Ind. Ltd.] | 1.5% |
| Ethanol | 25.0% |
| Propylene glycol monomethyl ether | 49.0% |
| Benzyl alcohol | 15.0% |

(Comparative Example 3)

| | |
|---|---|
| Valifast Black #3830 [produced by Orient Chemical Ind. Ltd.] | 5.0% |
| Salt formation product of C.I. Basic Violet 1 and sodium alkyldiphenyletherdisulfonate | 3.0% |
| Polyvinylbutyral BL-S [produced by Sekisui Chemical Co., Ltd.] | 1.5% |
| Markide No. 34 [produced by Arakawa Chemical Ind. Ltd.] | 1.5% |
| Ethanol | 25.0% |
| Propylene glycol monomethyl ether | 49.0% |
| Benzyl alcohol | 15.0% |

(Example 4)

| | |
|---|---|
| Spilon Blue 2GNHnew [produced by Hodogaya Chemical Co., Ltd.] | 2.0% |
| Salt formation product of C.T. Basic Violet 4 and sodium alkyldiphenyletherdisulfonate | 4.0% |
| Polyvinylbutyral BL-S [produced by Sekisui Chemical Co., Ltd.] | 2.0% |
| Ethanol | 27.0% |
| Propylene glycol monomethyl ether | 55.0% |
| Benzyl alcohol | 10.0% |

(Comparative Example 4)

| | |
|---|---|
| Spilon Blue 2GNHnew [produced by Hodogaya Chemical Co., Ltd.] | 2.0% |
| Salt formation product of C.I. Basic Violet 1 and sodium alkyldiphenyletherdisulfonate | 4.0% |
| Polyvinylbutyral BL-S [produced by Sekisui Chemical Co., Ltd.] | 2.0% |
| Ethanol | 27.0% |
| Propylene glycol monomethyl ether | 55.0% |
| Benzyl alcohol | 10.0% |

Oil-Based Ink Stamp Pad Form (Example 5)

| | |
|---|---|
| Printex #35 [produced by Degusa Co.] | 10.0% |
| Salt formation product of C.I. Basic Violet 4 and C.I. Acid Orange 7 | 5.0% |
| Polyvinylbutyral BM-1 [produced by Sekisui Chemical Co., Ltd.] | 3.0% |
| Polypropylene glycol | 40.0% |
| Dipropylene glycol | 42.0% |

(Comparative Example 5)

| | |
|---|---|
| Printex #35 [produced by Degusa Co.] | 10.0% |
| Salt formation product of C.I. Basic Violet 1 and C.I. Acid Orange 7 | 5.0% |
| Polyvinylbutyral BM-1 [produced by Sekisui Chemical Co., Ltd.] | 3.0% |
| Polypropylene glycol | 40.0% |
| Dipropylene glycol | 42.0% |

(Example 6)

| | |
|---|---|
| Valifast Black #3830 [produced by Orient Chemical Ind. Ltd.] | 10.0% |
| Salt formation product of C.I. Basic Violet 4 and sodium alkyldiphenyletherdidsulfonate | 20.0% |
| Polyvinylbutyral BL-S [produced by Sekisui Chemical Co., Ltd.] | 7.0% |
| Markide No. 34 [produced by Arakawa Chemical Ind. Ltd.] | 5.0% |
| Diglycerin monostearate | 1.0% |
| Dipropylene glycol | 17.0% |
| 3-Methoxy-3-methyl-1-butanol | 40.0% |

(Comparative Example 6)

| | |
|---|---|
| Valifast Black #3830 [produced by Orient Chemical Ind. Ltd.] | 10.0% |
| Salt formation product of C.T. Basic Violet 1 and sodium alkyldiphenyletherdisulfonate | 20.0% |
| Polyvinylbutyral BL-S [produced by Sekisui Chemical Co., Ltd.] | 7.0% |
| Markide No. 34 [produced by Arakawa Chemical Ind. Ltd.] | 5.0% |
| Diglycerin monostearate | 1.0% |
| Dipropylene glycol | 17.0% |
| 3-Methoxy-3-methyl-1-butanol | 40.0% |

(Example 7)

| | |
|---|---|
| Spilon Black GMH special [produced by Hodogaya Chemical Co., Ltd.] | 20.0% |
| Salt formation product of C.I. Basic Violet 4 and C.I. Acid Yellow 36 | 10.0% |
| Polyvinylbutyral BL-1 [produced by Sekisui Chemical Co., Ltd.] | 5.0% |
| YP90L [produced by Yasuhara Chemical] | 5.0% |
| 3-Methoxy-3-methyl-1-butanol | 45.0% |
| Benzyl alcohol | 15.0% |

(Comparative Example 7)

| | |
|---|---|
| Spilon Black GMH special [produced by Hodogaya Chemical Co., Ltd.] | 20.0% |
| Salt formation product of C.I. Basic Violet 1 and C.I. Acid Yellow 36 | 10.0% |
| Polyvinylbutyral BL-1 [produced by Sekisui Chemical Co., Ltd.] | 5.0% |
| YP90L [produced by Yasuhara Chemical] | 5.0% |
| 3-Methoxy-3-methyl-1-butanol | 45.0% |
| Benzyl alcohol | 15.0% |

Oil-Based Ballpoint Pen (Example 8)

| | |
|---|---|
| Spilon Black GMH special [produced by Hodogaya Chemical Co., Ltd.] | 8.0% |
| Salt formation product of C.I. Basic Violet 4 and C.I. Acid Orange 7 | 20.0% |
| Polyvinylbutyral BM-1 [produced by Sekisui Chemical Co., Ltd.] | 5.0% |
| RAROPEARL A101 [produced by BASF] | 5.0% |
| Dipropylene glycol | 10.0% |
| 3-Methoxy-1-butanol | 35.0% |
| Benzyl alcohol | 17.0% |

(Comparative Example 8)

| | |
|---|---|
| Spilon Black GMH special [produced by Hodogaya Chemical Co., Ltd.] | 8.0% |
| Salt formation product of C.I. Basic Violet 1 and C.T. Acid Orange 7 | 20.0% |
| Polyvinylbutyral BM-1 [produced by Sekisui Chemical Co., Ltd.] | 5.0% |
| RAROPEARL A101 [produced by BASF] | 5.0% |
| Dipropylene glycol | 10.0% |
| 3-Methoxy-1-butanol | 35.0% |
| Benzyl alcohol | 17.0% |

(Example 9)

| | |
|---|---|
| SAVINIL Blue GLS [produced by Clariant] | 16.0% |
| Salt formation product of C.I. Basic Violet 4 and sodium alkyldiphenyletherdisulfonate | 9.0% |
| Polyvinylbutyral BM-1 [produced by Sekisui Chemical Co., Ltd.] | 6.0% |
| RAROPEARL A101 [produced by BASF] | 5.0% |
| Dipropylene glycol | 10.0% |

| | |
|---|---|
| 3-Methoxy-1-butanol | 37.0% |
| Benzyl alcohol | 17.0% |
| (Comparative Example 9) | |
| | |
| SAVINIL Blue GLS [produced by Clariant] | 16.0% |
| Salt formation product of C.I. Basic Violet 1 and sodium alkyldiphenyletherdisulfonate | 9.0% |
| Polyvinylbutyral BM-1 [produced by Sekisui Chemical Co., Ltd.] | 6.0% |
| RAROPEARL A101 [produced by BASF] | 5.0% |
| Dipropylene glycol | 10.0% |
| 3-Methoxy-1-butanol | 37.0% |
| Benzyl alcohol | 17.0% |
| (Example 10) | |
| | |
| Spilon Black GMH special [produced by Hodogaya Chemical Co., Ltd.] | 9.0% |
| Salt formation product of C.I. Basic Violet 4 and C.I. Acid Yellow 36 | 10.0% |
| Salt formation product of C.I. Basic Violet 4 and sodium alkylsulfonate | 8.0% |
| Polyvinylbutyral BM-1 [produced by Sekisui Chemical Co., Ltd.] | 6.0% |
| YP90L [produced by Yasuhara Chemical] | 5.0% |
| 3-Methoxy-3-methyl-1-butanol | 32.0% |
| Benzyl alcohol | 6.0% |
| Diethylene glycol monophenyl ether | 18.0% |
| (Comparative Example 10) | |
| | |
| Spilon Black GMH special [produced by Hodogaya Chemical Co., Ltd.] | 9.0% |
| Salt formation product of C.I. Basic Violet 3 and C.I. Acid Yellow 36 | 10.0% |
| Salt formation product of C.I. Basic Violet 1 and sodium alkyldiphenyletherdisulfonate | 8.0% |
| Polyvinylbutyral BM-1 [produced by Sekisul Chemical Co., Ltd.] | 6.0% |
| YP90L [produced by Yasuhara Chemical] | 5.0% |
| 3-Methoxy-3-methyl-1-butanol | 40.0% |
| Benzyl alcohol | 4.0% |
| Diethylene glycol monophenyl ether | 12.0% |
| (Example 11) | |
| | |
| Carbon Black #25 [produced by Degusa Co.] | 10.0% |
| Salt formation product of C.I. Basic Violet 4 and sodium alkyldiphenyletherdisulfonate | 10.0% |
| Polyvinylbutyral BM-1 [produced by Sekisui Chemical Co., Ltd.] | 3.0% |
| Polyvinylbutyral BM-1 [produced by Sekisui Chemical Co., Ltd.] | 2.0% |
| Benzyl alcohol | 20.0% |
| Diethylene glycol monophenyl ether | 55.0% |
| (Comparative Example 11) | |
| | |
| Valifast Black #3830 [produced by Orient Chemical Ind. Ltd.] | 10.0% |
| Salt formation product of C.I. Basic Violet 1 and C.I. Acid Yellow 42 | 20.0% |
| Polyvinylbutyral BM-S [produced by Sekisui Chemical Co., Ltd.] | 8.0% |
| Markide No. 34 [produced by Arakawa Chemical Ind. Ltd.] | 7.0% |
| Propylene glycol monomethyl ether | 35.0% |
| 3-Methoxy-3-methyl-1-butanol | 20.0% |
| (Reference Example 1) | |
| | |
| Spilon Black GMH special [produced by Hodogaya Chemical Co., Ltd.] | 9.0% |
| Salt formation product of C.I. Basic Violet 3 and C.I. Acid Yellow 36 | 10.0% |
| Polyvinylbutyral BM-1 [produced by Sekisui Chemical Co., Ltd.] | 2.0% |
| YP90L [produced by Yasuhara Chemical] | 15.0% |
| 3-Methoxy-3-methyl-1-butanol | 10.0% |
| Benzyl alcohol | 13.0% |
| Diethylene glycol monophenyl ether | 41.0% |
| (Reference Example 2) | |
| | |
| Carbon Black #25 [produced by Degusa Co.] | 10.0% |
| Salt formation product of C.I. Basic Violet 1 and sodium alkyldiphenyletherdisulfonate | 10.0% |
| Polyvinylbutyral BL-1 [produced by Sekisui Chemical Co., Ltd.] | 3.0% |
| Polyvinylbutyral BM-1 [produced by Sekisui Chemical Co., Ltd.] | 2.0% |
| Benzyl alcohol | 20.0% |
| Diethylene glycol monophenyl ether | 55.0% |

Note)
The solubility of the salt formation product of C.I. Basic Violet 1 and C.I. Acid Yellow 42 is 20% or less.

Each of these blends was stirred by a disperser or dispersed by a bead mill or a roll mill to obtain an ink. Thereafter, the evaluation tests of ink were performed as follows.

Evaluation of Low-Temperature Stability and Cycle Temperature Stability of Ink

Into a 20 ml-volume glass bottle, about 15 ml of each ink obtained in Examples 1 to 11, Comparative Examples 1 to 11 and Reference Examples 1 and 2 was charged. After tightly corking, the inks were left standing for one month in a constant temperature chamber at 0° C. By observing the ink bottom using a spatula, the low-temperature stability of ink was evaluated. Furthermore, each product form was prepared and the deterioration of the product was also observed.

In the evaluation of cycle temperature stability, each glass bottle prepared in the same manner was placed in a constant temperature bath and after giving the temperature change of 0° C.→15° C.→30° C.→15° C.→0° C. every 6 hours, the ink bottom was observed.

Evaluation of Deterioration Degree of Product

The products each was prepared as follows and treated in a constant temperature chamber under the same temperature conditions as in the evaluation of ink.

Oil-Based Sign Pen Form

Each ink obtained in Examples and Comparative Examples was filled in an appropriate amount into a marking pen using a felt pen tip (Mitsubishi Oil-Based Marker "Peace") and used as a test sample for evaluation.

Oil-Based Ink Stamp Pad Form

Each ink obtained in Example 5 and Comparative Example 5 was filled in an appropriate amount into an ink stamp pad using a wool felt and extra fine fibers (Mitsubishi Oil-based Ink Stamp Pad "HSP-2G") and used as a test sample for evaluation.

The inks of Examples 6 and 7 and Comparative Examples 6 and 7 were low in the viscosity and for these inks, a needle felt and plain weave extra fine fibers were used.

Oil-Based Ballpoint Pen Form

Each ink obtained in Examples and Comparative Examples was filled in an appropriate amount into a polypropylene tube having an inner diameter of 1.60 mm, the tube was fixed to a stainless steel tip (the ball was made of a carbide alloy and had a diameter of 1.0 mm), and an ink follower was inserted from the rear end, thereby completing a ballpoint pen form. This was used as a test sample for evaluation.

Results

1) Evaluation of Low-Temperature Stability and Cycle Temperature Stability of Ink The state at the ink bottom in the glass bottle was evaluated by the following ratings of ○, Δ and x.

○: Nothing at the bottom.

Δ: A precipitate seem to be generated.

x: Due to many precipitates, generation of precipitates is clearly confirmed.

2) Deterioration Degree of Product

This was evaluated as follows.

a) Oil-Based Sign Pen Form

Freehand writing (writing of circles) was performed on PPC paper and the degree of "thinning (patchy or scratchy)" generated was rated as follows, ○: thinning is hardly generated, Δ: thinning is slightly generated and x: thinning is readily generated.

b) Oil-Based Ink Stamp Pad Form

The ink of the ink stamp pad was transferred to a rubber stamp and transferred to PPC paper. At this time, the difference in the density between the initial seal and the seal after aging was rated as follows, ○: no difference, Δ: slight difference and x: very clear difference.

c) Oil-Based Ballpoint Pen Form

Freehand writing (writing of circles) was performed on PPC paper and the degree of "thinning (patchy or scratchy)" generated was rated as follows, ○: thinning is hardly generated, Δ: thinning is slightly generated and x: thinning is readily generated.

TABLE 1

| Sample After Aging | Temperature Condition | Examples |||||||||||
|---|---|---|---|---|---|---|---|---|---|---|---|
| | | 1 | 2 | 3 | 4 | 5 | 6 | 7 | 8 | 9 | 10 | 11 |
| Ink | Low temperature | ○ | ○ | ○ | ○ | ○ | ○ | ○ | ○ | ○ | ○ | ○ |
| | Cycle | ○ | ○ | ○ | ○ | ○ | ○ | ○ | ○ | ○ | ○ | ○ |
| Degree of Deterioration of Product | Low temperature | ○ | ○ | ○ | ○ | ○ | ○ | ○ | ○ | ○ | ○ | ○ |
| | Cycle | ○ | ○ | ○ | ○ | ○ | ○ | ○ | ○ | ○ | ○ | ○ | ink compositions of Comparative Examples 1 to 11 which are out of the scope of the present invention.

Examples 21 to 25 and Comparative Examples 21 to 25

The following salt formation products were produced in the same manner as in the Production Example of salt formation products above.

Example 21

A salt formation product of C.I. Basic Violet 4 and C.I. Acid Orange 7.

Example 22

A salt formation product of C.I. Basic Violet 4 and sodium alkylsulfonate.

Example 23

A salt formation product of C.I. Basic Violet 4 and sodium alkyldiphenyletherdisulfonate.

Example 24

A salt formation product of C.I. Basic Green 1 and sodium alkyldiphenyletherdisulfonate.

Example 25

A salt formation product of C.I. Basic Violet 4 and C.I. Acid Yellow 36.

Comparative Example 21

A salt formation product of C.I. Basic Violet 1 and C.I. Acid Orange 7.

Comparative Example 22

A salt formation product of C.I. Basic Violet 3 and sodium alkylsulfonate.

Comparative Example 23

A salt formation product of C.I. Basic Violet 1 and sodium alkyldiphenyletherdisulfonate.

Comparative Example 24

A salt formation product of C.I. Basic Green 4 and sodium alkyldiphenyletherdisulfonate.

TABLE 2

| Sample After Aging | Temperature Condition | Comparative Examples ||||||||||| Reference Examples ||
|---|---|---|---|---|---|---|---|---|---|---|---|---|---|---|
| | | 1 | 2 | 3 | 4 | 5 | 6 | 7 | 8 | 9 | 10 | 11 | 1 | 2 |
| Ink | Low temperature | Δ | Δ | Δ | Δ | Δ | Δ | x | Δ | Δ | Δ | — | ○ | ○ |
| | Cycle | x | x | Δ | Δ | x | x | x | x | x | x | — | ○ | ○ |
| Degree of Deterioration of Product | Low temperature | x | x | Δ | Δ | x | Δ | x | x | x | Δ | — | ○ | ○ |
| | Cycle | x | x | Δ | Δ | x | Δ | x | x | x | Δ | — | ○ | ○ |

(Note)
In Comparative Example 11, the blend could not be formed into an ink.

As is clearly seen from the results above, the ink composition of Examples 1 to 11 according to the present invention are very excellent in view of ink stability and deterioration of performance as a product as compared with Comparative Example 25

A salt formation product of C.I. Basic Violet 3 and C.I. Acid Yellow 36.

Evaluation of Stability on Combination Use with Metal Complex Salt Dye

Spilon Black GMH (produced by Hodogaya Chemical Co., Ltd.) was used as the metal complex salt dye and the dissolution stability when the dyes produced in Examples 21 to 25 and Comparative Examples 21 to 25 each was used in combination with the metal complex salt dye was tested and evaluated according to the following criteria.

Test 1

A solution containing 10 wt % of Spilon Black GMH, 10 wt % of the dye produced in Examples or Comparative Examples, and 80 wt % of propylene glycol monomethyl ether was prepared.

Test 2

A solution containing 25 wt % of Spilon Black GMH, 25 wt % of the dye produced in Examples or Comparative Examples, and 50 wt % of propylene glycol monomethyl ether was prepared.

A glass bottle containing each solution prepared in respective tests was tightly corked and left standing in a constant temperature chamber for 7 days by changing the temperature with one cycle being 0° C. for 6 hours→15° C. for 6 hours→30° C. for 6 hours→15° C. for 6 hours. Thereafter, the presence or absence of precipitate was confirmed.

Criteria for Test Evaluation

○: Completely no precipitate.

Δ: Slight precipitate.

x: Precipitate is resent.

xx: Due to increase of viscosity, not suitable as a dye for writing instruments.

The results obtained in the tests are shown in Table 3.

TABLE 3

| | Examples | | | | | Comparative Examples | | | | |
|---|---|---|---|---|---|---|---|---|---|---|
| No. | 21 | 22 | 23 | 24 | 25 | 21 | 22 | 23 | 24 | 25 |
| Test 1 | ○ | ○ | ○ | ○ | ○ | x | x | x | x | ○ |
| Test 2 | ○ | Δ | ○ | ○ | ○ | xx | x | xx | xx | x |

As is apparent from the results in Table 3 above, the dyes obtained in Example 21 to 25 exhibited good stability on use in combination with a metal complex salt dye as compared with the dyes obtained in Comparative Examples 21 to 25.

Furthermore, the dyes using an organic acid or an organic acid salt containing an aromatic ring having at least one sulfonic acid group exhibited good stability on use in combination with a metal complex salt dye as compared with the dye using other organic acid or organic acid salt (Example 22).

INDUSTRIAL APPLICABILITY

According to the present invention, an oil-based ink composition having performance not obtainable in conventional oil-based ink compositions is provided, namely, a dye of giving a concealing property by forming a black or blue color can be added in a high concentration on use of an alcohol having 2 to more carbon atoms, a polyhydric alcohol or a glycol ether, the compatibility with a metal complex salt dye or other raw materials in ink is good even under the high-concentration condition, and the stability in aging at low temperatures is excellent.

Furthermore, according to the present invention, a triarylmethane-based dye for writing instrument ink is provided, which exhibits good stability when dissolved in an alcohol having 4 or less carbon atoms, a glycol or a glycol ether commonly used as a solvent for writing instrument ink, even on use in combination with a metal complex salt dye. When this dye is dissolved in a propylene glycol monomethyl ether, precipitates are not generated, an extreme increase of viscosity does not occur, and flowability high enough to enable use as an ink for a ballpoint pen or sign pen having a channel or orifice in the structure can be maintained.

What is claimed is:

1. An ink composition comprising at least one triarylmethane-based dye as a coloring material, an alcohol having 2 or more carbon atoms, a polyhydric alcohol or a glycol ether as a solvent, and a resin which can dissolve in said solvent, said resin comprising at least polyvinylbutyral, said triarylmethane-based dye being represented by the following formula:

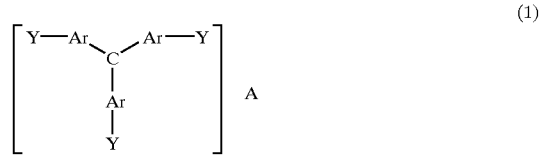

wherein each Ar is independently an aryl group substituted, or not substituted, by halogen or an alkyl group, each Y is independently a diethylamino group or hydrogen, provided that at least two Y are a diethylamino group, A is a halogen or an organic acid group, and A is charge-balanced to the residue.

2. The ink composition as claimed in claim 1, wherein three aryl groups in said dye all are a phenyl group.

3. The ink composition as claimed in claim 1, wherein three Y in said dye all are a diethylamino group.

4. The ink composition as claimed in claim 1, wherein all the aryl groups in said dye are not substituted by a halogen or an alkyl group.

5. The ink composition as claimed in claim 1, wherein said dye is a compound where A is an organic acid group, and dissolves in an alcohol having 2 or more carbon atoms, a polyhydric alcohol or a glycol ether used as a solvent, to a concentration of 20 mass % or more.

6. The ink composition as claimed in claim 1, wherein A in said dye is an organic acid group selected from the group consisting of carboxyl group, an acyl group, a thiocarboxyl group, a dithiocarboxyl group, a sulfonic acid group, a sulfinic acid group, a sulfenic acid group, a sulfoamino group, a mercapto group, a phenolic hydroxyl group, a hydroxyamino group and a hydroxyimino group.

7. The ink composition as claimed in claim 1, wherein A in said dye is an acid group of an organic acid selected from the group consisting of adipic acid, acetoacetic acid, anisic acid, abietic acid, benzoic acid, succinic acid, citric acid, phthalic acid, oleic acid, stearic acid, linoleic acid, linolenic acid, toluic acid, naphthoic acid, palmitic acid, hydroxybenzoic acid, cinnamic acid, hydroxycinnamic acid, pimaric acid, piperonylic acid, phenylpropionic acid, phenoxyacetic acid, mandelic acid, maleic acid, rosin-modified maleic acid, hexanethiocarboxylic acid, hexanedithiocarboxylic acid, laurylsulfonic acid, 1-piperidinesulfinic acid, benzenesulfenic acid, ethanesulfinyl chloride, phenylmethanethiol, benzenedithiol, phenylhydroxylamine, hydroxyaminophenol, cyclohexanoneoxime, benzaldehydeoxime, laurylphosphoric acid ester, dinonylphenylphosphoric acid ester, anthranilic acid and hippuric acid.

8. The ink composition as claimed in claim 1, wherein A in said dye comprises an aromatic ring having at least one sulfonic acid group.

9. The ink composition as claimed in claim 8, wherein A in said dye is an anionic surfactant or an acidic dye.

10. The ink composition as claimed in claim 1, which further contains a metal complex salt dye or a pigment.

11. The ink composition as claimed in claim 1, wherein said solvent comprising an alcohol having 2 or more carbon atoms, a polyhydric alcohol or a glycol ether and being an aliphatic solvent occupies 40 mass % or more of the entire solvent of the ink composition.

12. The ink composition as claimed in claim 1, wherein said solvent contains at least one of the following solvents i) to iii) as the main solvent:

i) a solvent represented by the chemical formula: $C_nH_{2n+1}OC_3H_6OH$ wherein n is an integer of 1 to 3;

ii) propylene glycol monomethyl ether; and iii) a solvent represented by the following structural formula (2):

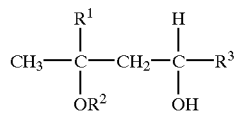

(2)

wherein $R^1$, $R^2$ and $R^3$ each is independently H or $CH_3$.

13. A sign pen comprising an ink composition, said ink composition comprising at least one triarylmethane-based dye as a coloring material, an alcohol having 2 or more carbon atoms, a polyhydric alcohol or a glycol ether as a solvent, and a resin which can dissolve in said solvent, said resin comprising at least polyvinylbutyral, said triarylmethane-based dye being represented by the following formula:

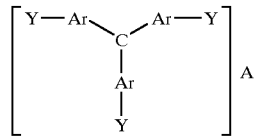

(1)

wherein each Ar is independently an aryl group substituted, or not substituted, by halogen or an alkyl group, each Y is independently a diethylamino group or hydrogen, provided that at least two Y are a diethylamino group, A is a halogen or an organic acid group, and A is charge-balanced to the residue.

14. A ballpoint pen comprising an ink composition, said ink composition comprising at least one triarylmethane-based dye as a coloring material, an alcohol having 2 or more carbon atoms, a polyhydric alcohol or a glycol ether as a solvent, and a resin which can dissolve in said solvent, said resin comprising at least polyvinylbutyral, said triarylmethane-based dye being represented by the following formula:

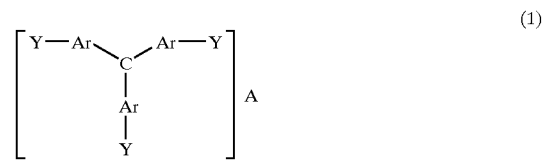

(1)

wherein each Ar is independently an aryl group substituted, or not substituted, by halogen or an alkyl group, each Y is independently a diethylamino group or hydrogen, provided that at least two Y are a diethylamino group, A is a halogen or an organic acid group, and A is charge-balanced to the residue.

15. An ink stamp pad comprising an ink composition, said ink composition comprising at least one triarylmethane-based dye as a coloring material, an alcohol having 2 or more carbon atoms, a polyhydric alcohol or a glycol ether as a solvent, and a resin which can dissolve in said solvent, said resin comprising at least polyvinylbutyral, said triarylmethane-based dye being represented by the following formula:

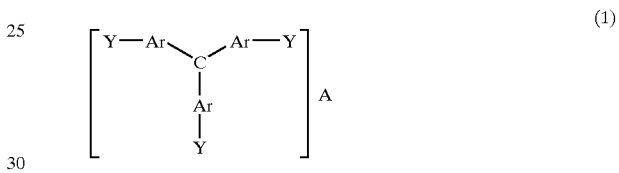

(1)

wherein each Ar is independently an aryl group substituted, or not substituted, by halogen or an alkyl group, each Y is independently a diethylamino group or hydrogen, provided that at least two Y are a diethylamino group, A is a halogen or an organic acid group, and A is charge-balanced to the residue.

16. The ink composition as claimed in claim 9, wherein said anionic surfactant is selected from the group consisting of alkylbenzenesulfonic acid and salts thereof, alkylnaphthalenesulfonic acid and salts thereof, alkylarylsulfonate-formalin condensate and salts thereof, and alkyldiphenyletherdisulfonic acid and salts thereof.

17. The ink composition as claimed in claim 9, wherein said acidic dyes are C.I. Acid Orange 7, C.I. Acid Yellow 36 and C.I. Acid Red 88.

18. The ink composition as claimed in claim 13, wherein three aryl groups in said dye all are a phenyl group.

19. The ink composition as claimed in claim 13, wherein three Y in said dye all are a diethylamino group.

20. The ink composition as claimed in claim 13, wherein all the aryl groups in said dye are not substituted by a halogen or an alkyl group.

21. The ink composition as claimed in claim 13, wherein said dye is a compound where A is an organic acid group, and dissolves in an alcohol having 2 or more carbon atoms, a polyhydric alcohol or a glycol ether used as a solvent, to a concentration of 20 mass % or more.

22. The ink composition as claimed in claim 13, wherein A in said dye is an organic acid group selected from the group consisting of carboxyl group, an acyl group, a thiocarboxyl group, a dithiocarboxyl group, a sulfonic acid group, a sulfinic acid group, a sulfenic acid group, a sulfoamino group, a mercapto group, a phenolic hydroxyl group, a hydroxyamino group and a hydroxyimino group.

23. The ink composition as claimed in claim 13, wherein A in said dye is an acid group of an organic acid selected from the group consisting of adipic acid, acetoacetic acid, anisic acid, abietic acid, benzoic acid, succinic acid, citric acid, phthalic acid, oleic acid, stearic acid, linoleic acid, linolenic acid, toluic acid, naphthoic acid, palmitic acid, hydroxybenzoic acid, cinnamic acid, hydroxycinnamic acid, pimaric acid, piperonylic acid, phenylpropionic acid, phenoxyacetic acid, mandelic acid, maleic acid, rosin-modified maleic acid, hexanethiocarboxylic acid, hexanedithiocarboxylic acid, laurylsulfonic acid, 1-piperidinesulfinic acid, benzenesulfenic acid, ethanesulfinyl chloride, phenylmethanethiol, benzenedithiol, phenylhydroxylamine, hydroxyaminophenol, cyclohexanoneoxime, benzaldehydeoxime, laurylphosphoric acid ester, dinonyiphenyiphosphoric acid ester, anthranilic acid and hippuric acid.

24. The ink composition as claimed in claim 13, wherein A in said dye comprises an aromatic ring having at least one sulfonic acid group.

25. The ink composition as claimed in claim 24, wherein A in said dye is an anionic surfactant or an acidic dye.

26. The ink composition as claimed in claim 25, wherein said anionic surfactant is selected from the group consisting of alkylbenzenesulfonic acid and salts thereof, alkylnaphthalenesulfonic acid and salts thereof, alkylarylsulfonate-formalin condensate and salts thereof, and alkyldiphenyletherdisulfonic acid and salts thereof.

27. The ink composition as claimed in claim 25, wherein said acidic dyes are C.I. Acid Orange 7, C.I. Acid Yellow 36 and C.I. Acid Red 88.

28. The ink composition as claimed in claim 13, which further contains a metal complex salt dye or a pigment.

29. The ink composition as claimed in claim 13, wherein said solvent comprising an alcohol having 2 or more carbon atoms, a polyhydric alcohol or a glycol ether and being an aliphatic solvent occupies 40 mass % or more of the entire solvent of the ink composition.

30. The ink composition as claimed in claim 13, wherein said solvent contains at least one of the following solvents i) to iii) as the main solvent:

i) a solvent represented by the chemical formula: $C_nH_{2n+1}OC_3H_6OH$ wherein n is an integer of 1 to 3;

ii) propylene glycol monomethyl ether; and iii) a solvent represented by the following structural formula (2):

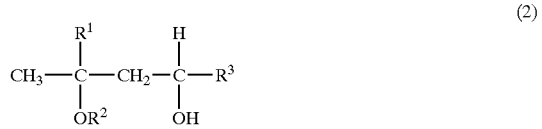

(2)

wherein $R^1$, $R^2$ and $R^3$ each is independently H or $CH_3$.

31. The ink composition as claimed in claim 14, wherein three aryl groups in said dye all are a phenyl group.

32. The ink composition as claimed in claim 14, wherein three Y in said dye all are a diethylamino group.

33. The ink composition as claimed in claim 14, wherein all the aryl groups in said dye are not substituted by a halogen or an alkyl group.

34. The ink composition as claimed in claim 14, wherein said dye is a compound where A is an organic acid group, and dissolves in an alcohol having 2 or more carbon atoms, a polyhydric alcohol or a glycol ether used as a solvent, to a concentration of 20 mass % or more.

35. The ink composition as claimed in claim 14, wherein A in said dye is an organic acid group selected from the group consisting of carboxyl group, an acyl group, a thiocarboxyl group, a dithiocarboxyl group, a sulfonic acid group, a sulfinic acid group, a sulfenic acid group, a sulfoamino group, a mercapto group, a phenolic hydroxyl group, a hydroxyamino group and a hydroxyimino group.

36. The ink composition as claimed in claim 14, wherein A in said dye is an acid group of an organic acid selected from the group consisting of adipic acid, acetoacetic acid, anisic acid, abietic acid, benzoic acid, succinic acid, citric acid, phthalic acid, oleic acid, stearic acid, linoleic acid, linolenic acid, toluic acid, naphthoic acid, palmitic acid, hydroxybenzoic acid, cinnamic acid, hydroxycinnamic acid, pimaric acid, piperonylic acid, phenylpropionic acid, phenoxyacetic acid, mandelic acid, maleic acid, rosin-modified maleic acid, hexanethiocarboxylic acid, hexanedithiocarboxylic acid, laurylsulfonic acid, 1-piperidinesulfinic acid, benzenesulfenic acid, ethanesulfinyl chloride, phenylmethanethiol, benzenedithiol, phenylhydroxylamine, hydroxyaminophenol, cyclohexanoneoxime, benzaldehydeoxime, laurylphosphoric acid ester, dinonylphenylphosphoric acid ester, anthranilic acid and hippuric acid.

37. The ink composition as claimed in claim 14, wherein A in said dye comprises an aromatic ring having at least one sulfonic acid group.

38. The ink composition as claimed in claim 37, wherein A in said dye is an anionic surfactant or an acidic dye.

39. The ink composition as claimed in claim 38, wherein said anionic surfactant is selected from the group consisting of alkylbenzenesulfonic acid and salts thereof, alkylnaphthalenesulfonic acid and salts thereof, alkylarylsulfonate-formalin condensate and salts thereof, and alkyldiphenyletherdisulfonic acid and salts thereof.

40. The ink composition as claimed in claim 38, wherein said acidic dyes are C.I. Acid Orange 7, C.I. Acid Yellow 36 and C.I. Acid Red 88.

41. The ink composition as claimed in claim 14, which further contains a metal complex salt dye or a pigment.

42. The ink composition as claimed in claim 14, wherein said solvent comprising an alcohol having 2 or more carbon atoms, a polyhydric alcohol or a glycol ether and being an aliphatic solvent occupies 40 mass % or more of the entire solvent of the ink composition.

43. The ink composition as claimed in claim 14, wherein said solvent contains at least one of the following solvents i) to iii) as the main solvent:

i) a solvent represented by the chemical formula: $C_nH_{2n+1}OC_3H_6OH$ wherein n is an integer of 1 to 3;

ii) propylene glycol monomethyl ether; and iii) a solvent represented by the following structural formula (2):

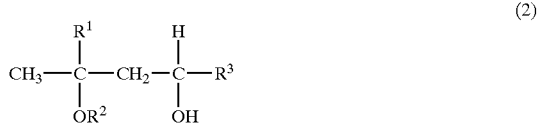

(2)

wherein $R^1$, $R^2$ and $R^3$ each is independently H or $CH_3$.

44. The ink composition as claimed in claim 15, wherein three aryl groups in said dye all are a phenyl group.

45. The ink composition as claimed in claim 15, wherein three Y in said dye all are a diethylamino group.

46. The ink composition as claimed in claim 15, wherein all the aryl groups in said dye are not substituted by a halogen or an alkyl group.

47. The ink composition as claimed in claim 15, wherein said dye is a compound where A is an organic acid group, and dissolves in an alcohol having 2 or more carbon atoms, a polyhydric alcohol or a glycol ether used as a solvent, to a concentration of 20 mass % or more.

48. The ink composition as claimed in claim 15, wherein A in said dye is an organic acid group selected from the group consisting of carboxyl group, an acyl group, a thiocarboxyl group, a dithiocarboxyl group, a sulfonic acid group, a sulfinic acid group, a sulfenic acid group, a sulfoamino group, a mercapto group, a phenolic hydroxyl group, a hydroxyamino group and a hydroxyimino group.

49. The ink composition as claimed in claim 15, wherein A in said dye is an acid group of an organic acid selected from the group consisting of adipic acid, acetoacetic acid, anisic acid, abietic acid, benzoic acid, succinic acid, citric acid, phthalic acid, oleic acid, stearic acid, linoleic acid, linolenic acid, toluic acid, naphthoic acid, palmitic acid, hydroxybenzoic acid, cinnamic acid, hydroxycinnamic acid, pimaric acid, piperonylic acid, phenylpropionic acid, phenoxyacetic acid, mandelic acid, maleic acid, rosin-modified maleic acid, hexanethiocarboxylic acid, hexanedithiocarboxylic acid, laurylsulfonic acid, 1-piperidinesulfinic acid, benzenesulfenic acid, ethanesulfinyl chloride, phenylmethanethiol, benzenedithiol, phenylhydroxylamine, hydroxyaminophenol, cyclohexanoneoxime, benzaldehydeoxime, laurylphosphoric acid ester, dinonylphenylphosphoric acid ester, anthranilic acid and hippuric acid.

50. The ink composition as claimed in claim 15, wherein A in said dye comprises an aromatic ring having at least one sulfonic acid group.

51. The ink composition as claimed in claim 50, wherein A in said dye is an anionic surfactant or an acidic dye.

52. The ink composition as claimed in claim 51, wherein said anionic surfactant is selected from the group consisting of alkylbenzenesulfonic acid and salts thereof, alkylnaphthalenesulfonic acid and salts thereof, alkylarylsulfonate-formalin condensate and salts thereof, and alkyldiphenyletherdisulfonic acid and salts thereof.

53. The ink composition as claimed in claim 51, wherein said acidic dyes are C.I. Acid Orange 7, C.I. Acid Yellow 36 and C.I. Acid Red 88.

54. The ink composition as claimed in claim 15, which further contains a metal complex salt dye or a pigment.

55. The ink composition as claimed in claim 15, wherein said solvent comprising an alcohol having 2 or more carbon atoms, a polyhydric alcohol or a glycol ether and being an aliphatic solvent occupies 40 mass % or more of the entire solvent of the ink composition.

56. The ink composition as claimed in claim 15, wherein said solvent contains at least one of the following solvents i) to iii) as the main solvent:
i) a solvent represented by the chemical formula: $C_nH_{2n+1}OC_3H_6OH$ wherein n is an integer of 1 to 3;
ii) propylene glycol monomethyl ether; and
iii) a solvent represented by the following structural formula (2):

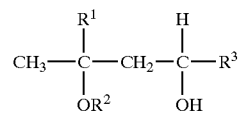

(2)

wherein $R^1$, $R^2$ and $R^3$ each is independently H or $CH_3$.